US010274000B1

(12) United States Patent
Bulow (10) Patent No.: US 10,274,000 B1
(45) Date of Patent: Apr. 30, 2019

(54) CAPTIVE FASTENER WITH ENGAGING AND LOCKING MECHANISM

(71) Applicant: Lockheed Martin Corporation, Bethesda, MD (US)

(72) Inventor: Jeffrey A. Bulow, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 677 days.

(21) Appl. No.: 14/788,943

(22) Filed: Jul. 1, 2015

Related U.S. Application Data (62) Division of application No. 13/552,802, filed on Jul. 19, 2012, now Pat. No. 9,115,744.

(51) Int. Cl.
*F16B 21/00* (2006.01)
*F16B 13/08* (2006.01)
*F16B 21/16* (2006.01)
*F16B 19/10* (2006.01)
*F16B 39/00* (2006.01)

(52) U.S. Cl.
CPC ........ *F16B 13/0808* (2013.01); *F16B 19/109* (2013.01); *F16B 21/16* (2013.01); *F16B 39/00* (2013.01)

(58) Field of Classification Search
CPC .... F16B 13/0808; F16B 19/109; F16B 21/12; F16B 21/125; F16B 2021/04
USPC .......................... 411/344, 345, 347, 549–552
See application file for complete search history.

(56) References Cited

U.S. PATENT DOCUMENTS

| | | | |
|---|---|---|---|
| 2,377,086 A | 5/1945 | Lang | |
| 2,408,560 A | 10/1946 | Keehn | |
| 3,534,650 A * | 10/1970 | Kubokawa | F16B 19/109 |
| | | | 24/453 |
| 3,933,390 A | 1/1976 | Barrett et al. | |
| 5,937,487 A * | 8/1999 | Bauer | A41F 1/002 |
| | | | 24/303 |
| 6,685,408 B1 | 2/2004 | Fusco | |
| 7,748,939 B2 | 7/2010 | Bulow et al. | |
| 7,997,843 B2 * | 8/2011 | Bowers | F16B 21/04 |
| | | | 24/663 |
| 8,439,613 B1 * | 5/2013 | Prentice | F16B 13/0808 |
| | | | 411/121 |
| 2008/0014049 A1 * | 1/2008 | Dvorak | F16B 37/0857 |
| | | | 411/433 |

* cited by examiner

*Primary Examiner* — Gary W Estremsky
(74) *Attorney, Agent, or Firm* — Howard IP Law Group (57) ABSTRACT

A fastener comprising a body having a first portion and a second portion is provided. The first and second body portions are adjustably connected such that the distance between the first body portion and the second body portion is adjustable along a longitudinal axis of the body. A first flange is arranged on the first body portion and a second flange is arranged on the second body portion. A locking mechanism is provided for securing the first and second body portions together while permitting adjustment of the distance between the first and second body portions in the direction of the longitudinal axis.

16 Claims, 12 Drawing Sheets

CAPTIVE FASTENER WITH ENGAGING AND LOCKING MECHANISM

CROSS-REFERENCE TO RELATED APPLICATIONS

This application is a divisional application of U.S. patent application Ser. No. 13/552,802, now issued U.S. Pat. No. 9,115,744, entitled CAPTIVE FASTENER WITH ENGAGING AND LOCKING MECHANISM, filed Jul. 19, 2012, the entire contents of which is herein incorporated by reference for all purposes.

FIELD OF THE INVENTION

The present invention relates generally to fasteners, and more particularly to captive fasteners used to secure assembled items and components in such a manner as to be disassembled rapidly for maintenance without risk of loss of the fastener particularly in, but not limited to, high vibration and other hostile environments.

BACKGROUND

Electronic components, mechanically assembled items, and devices, such as RADAR transmitters, electronics cabinets, computers and the like must often be installed onto moving or articulating articles, such as ships and aircraft, by way of example only. In addition to significant forces generated by the movement of these articles, these components may also be exposed to heavy vibrations. To maintain a clean environment, as well as to provide sufficient structural support, these components and devices are often housed within or mounted onto racks. Captive fasteners are typically used to removably secure the positions of the components within the rack, as well as to attach panels and other items to the rack chassis to improve structural and environmental integrity. The term "captive" typically refers to the moveably adjustable engagement of one part of the fastener in a panel/cover and the engagement of the second part of the fastener in the rack/housing to which the panel/cover is to be attached. In the case of the present disclosure, the definition of "captive" is extended to include the engagement of the fastener in a panel/cover, or mounted component/assembly when the panel/cover, or mounted component/assembly is removed for maintenance.

When the rack mounted components need to be accessed, for instance for repair or replacement, the panels may need to be removed in order to gain access. Due to the number of fasteners and the strength associated with these fasteners, it takes significant time to remove them. For instance, existing fasteners used on one radar transmitter cover may exceed twelve (12) minutes to remove. Further still, recommended industry fasteners are threaded and require up to eight (8) turns to seat or extract. The longevity associated with these fasteners is also questionable, as is reliability due to, for example, captive washer breaks.

Accordingly, there is a need to provide a fastener that engages and disengages with less than a full rotation to ease the difficulty associated with removal and securing the fastener, as well as increasing the speed with which fastener manipulation can be performed. In addition, there is a need to provide a fastener that minimizes the affects of vibration, and to provide a fastener that can secure variable sized loads.

SUMMARY

In one embodiment of the present disclosure, a fastener comprising a body having a first portion and a second portion is provided. The first and second body portions are adjustably connected such that the distance between the first body portion and the second body portion is adjustable along a longitudinal axis of the body. A first flange is arranged on the first body portion and a second flange is arranged on the second body portion. A locking mechanism is provided for securing the first and second body portions together while permitting adjustment of the distance between the first and second body portions in the direction of the longitudinal axis.

DETAILED DESCRIPTION

It is to be understood that the figures and descriptions of the present invention have been simplified to illustrate elements that are relevant for a clear understanding of the present invention, while eliminating, for purposes of clarity, many other elements found in fasteners, including captive fasteners. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include fasteners configured for securing two objects together via coaxial holes formed in the objects. In one embodiment, a fastener includes a body having a first section and a second section adjustably connected to one another. The first section includes at least one first flange moveably attached thereto. The flange is configured to be moveable with respect to the first section between a first or collapsed position, and a second or expanded position. In one embodiment, the flange is biased into the second position via, for example, a spring element. The second section includes a second flange, for example, a fixed, annular flange.

The fastener is configured to be inserted through the coaxial holes in the two objects to be secured together such that the objects are captured between the first and second flanges. An opening may be provided through both the first and second body sections. The opening is in communication with the at least one flange of the first section such that an actuator may be inserted through the body, and used to bias the at least one flange from the second position to the first position via, for example, pressure applied thereon.

Figure 1:
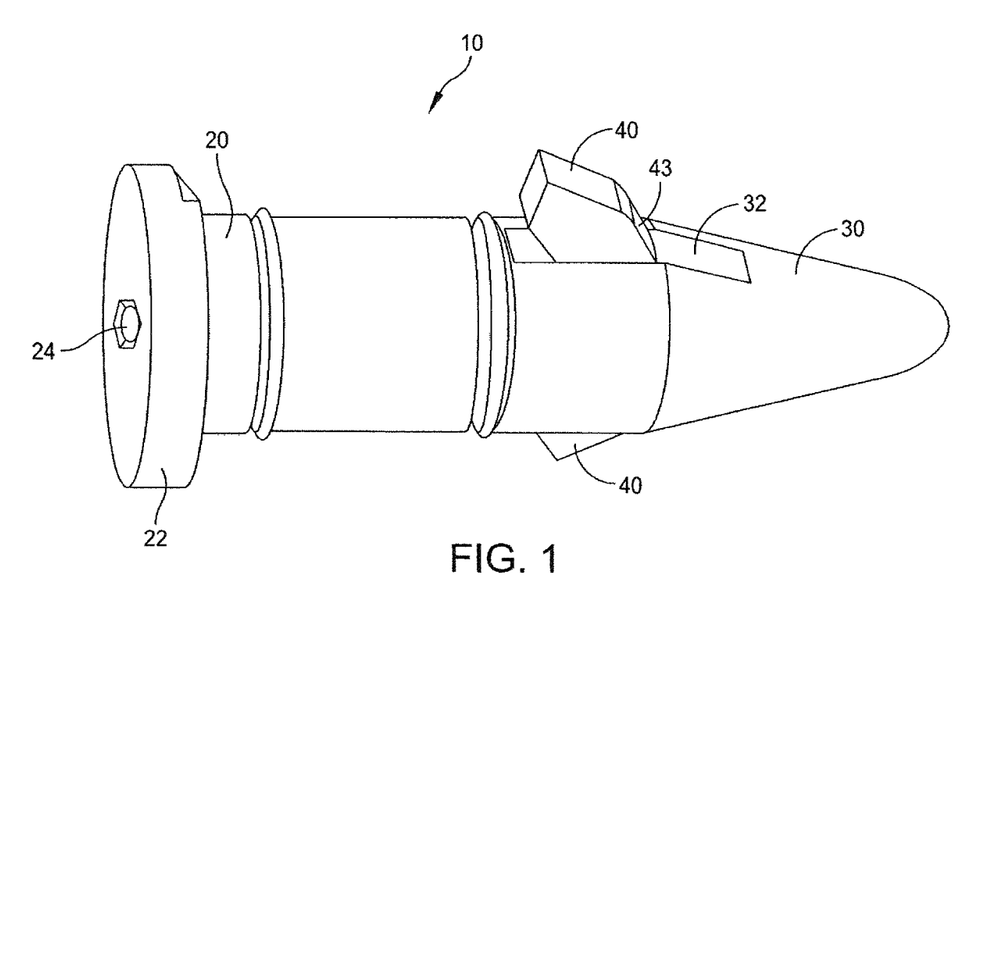
FIG. 1 is a perspective view of a fastener according to an embodiment of the present disclosure.

Referring generally to FIG. 1, an exemplary fastener 10 according to an embodiment of the present disclosure is provided. As set forth above, fastener 10 comprises a first body section 30 having moveable flanges 40 attached thereto. In the illustrated embodiments, flanges 40 are arranged within slots or openings 32 formed in first section 30. A second body section 20 is adjustably connected to first section 30, and comprises a generally annular flange 22. An opening 24 is provided within second section 20. As will be set forth in greater detail herein, opening 24 may be in communication with a corresponding opening (not shown) in first section 30.

Figure 2A:
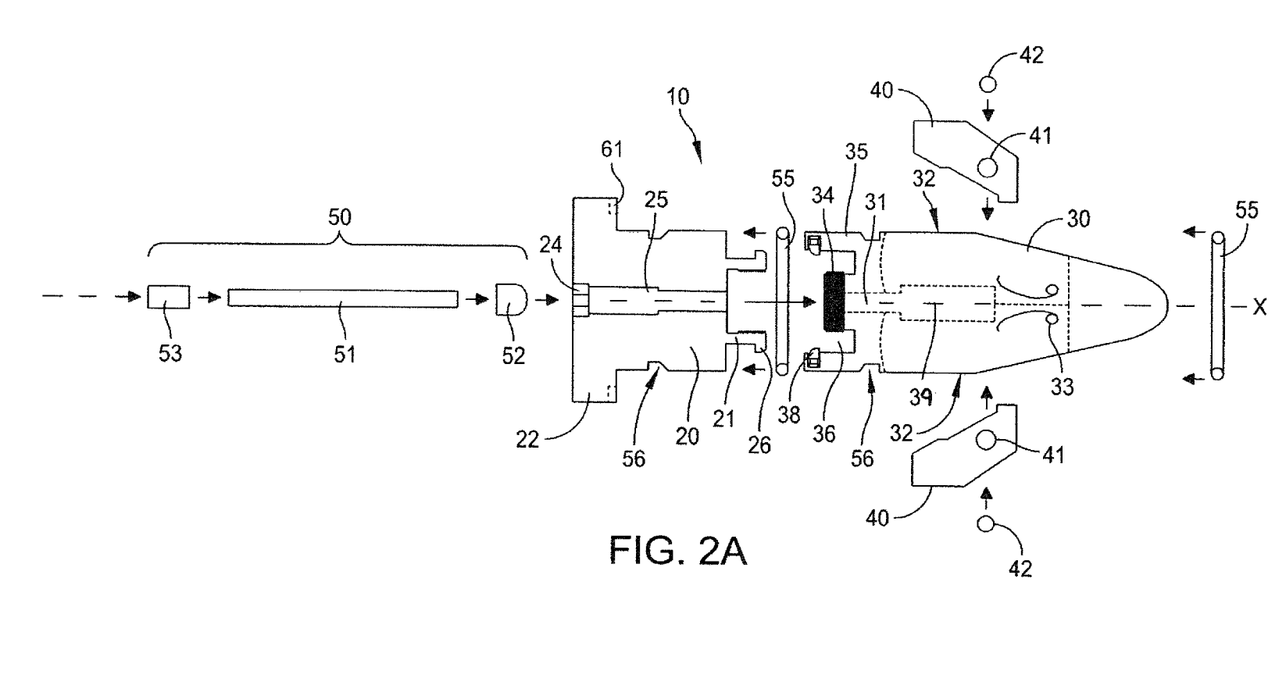
FIG. 2A is an exploded cross-sectional view of the fastener of FIG. 1.
Figure 2B:
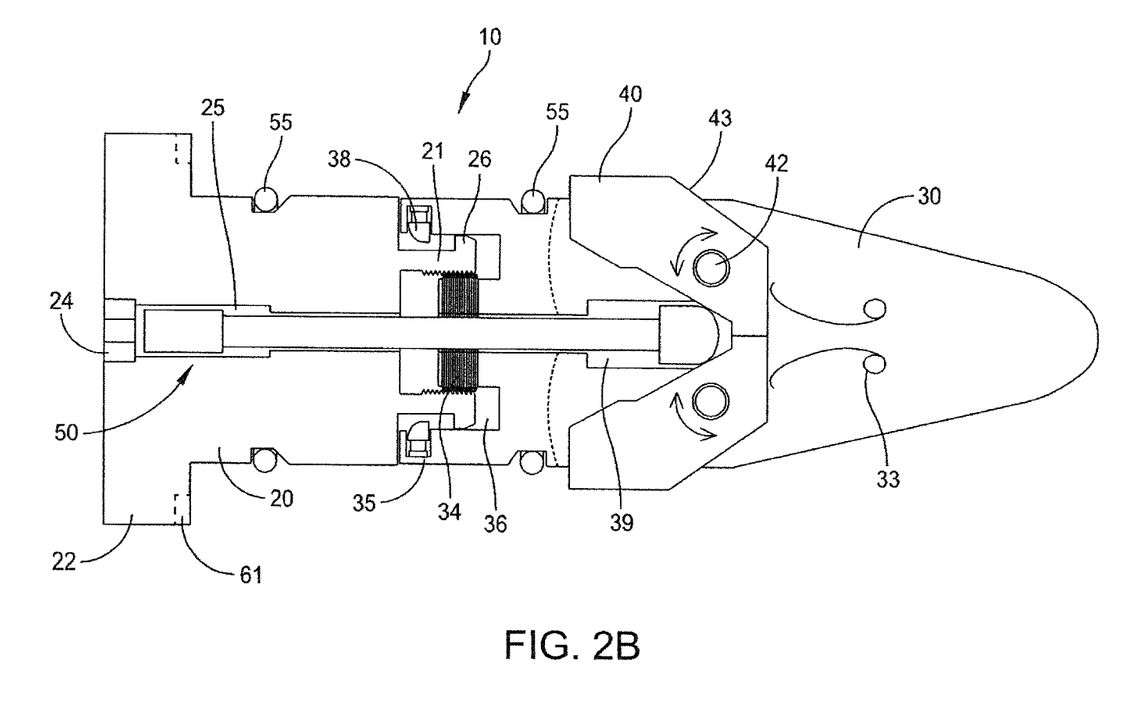
FIG. 2B is an assembled cross-sectional view of the fastener of FIGS. 1 and 2A.

Referring generally to FIGS. 2A and 2B, exploded and assembled cross-sectional views, respectively, of exemplary fastener 10 and an actuator assembly 50 are provided. First body section 30 comprises a first end having a generally conical or tapered profile, and a second end configured for adjustably mating with second body section 20. As set forth above, first body section 30 comprises a plurality of flanges 40 moveably attached thereto. Flanges 40 may be arranged within slots 32 formed in section 30, and pivotally attached thereto via pins or fasteners 42 inserted through apertures 41 formed in flanges 40. Once installed, flanges 40 may be free to pivot within first section 30 about pins 42 in the indicated fashion (see FIG. 2B). A spring element 33 may be arranged within first section 30, and configured to bias flanges 40 into a generally expanded or locked position (see FIG. 1). By way of example only, spring element 33 may comprise a leaf or coil spring, or any other suitable elastic element or material used to store mechanical energy.

The second end of first section 30 is configured to adjustably mate with a first end of second section 20. In the exemplary embodiment, this adjustable connection is achieved via a threaded arrangement formed between first and second sections 30,20. More specifically, first section 30 comprises a cylindrical protrusion 34 having a threaded surface formed thereon for mating with a coaxial (see axis x) complementary annular threaded portion 21 of second section 20. Rotation of at least one of first and second sections 30,20 may be operative to thread these sections together forming a single unit (see FIG. 2B). Moreover, as a result of this adjustable connection, the overall length of fastener 10, and more specifically, the distance between flange 22 and flange(s) 40 may be selectably altered. While first and second sections 30,20 may be rotated with respect to one another by any means, in an exemplary embodiment, aperture 24 of second section 20 may comprise a hexagonal inner profile (see FIG. 1) such that, for example, a conventional Allen key or hex socket may be inserted therein and rotated.

While a threaded arrangement is shown and described, it should be understood that other means to adjustably fasten the first and second body sections together may be implemented without departing from the scope of the present disclosure. For example, ratcheting or lockable sliding arrangements may be implemented between first section 30 and second section 20 in order to provide a secure, adjustable length connection therebetween.

In one embodiment of the present disclosure, a locking function is provided to secure first section 30 to second section 20 once the sections are threadably mated. By way of example only, this locking function may be achieved by a biased, or spring loaded locking mechanism formed on at least one of first and second sections 30,20. In the illustrated embodiments, an annular outer protrusion 35 is formed on first section 30 having at least one locking element 38 arranged thereon. Locking element 38 may comprise a locking surface which is biased radially inward with respect to axis x via, for example, one or more springs. Annular threaded portion 21 of second section 20 comprises at least one radially-extending locking feature 26. Referring generally to FIG. 2B, locking element 38 may comprise a tapered surface such that threading the first and second sections together causes locking feature 26 to bias locking element 38 radially outward, allowing for threaded protrusion 21 and locking feature 26 to displace into an annular channel 36 formed between threaded protrusion 34 and annular protrusion 35. Once locking feature 26 has passed locking element 38, element 38 is free to be biased radially inward, capturing locking feature 26 within annular channel 36. In this way, first and second sections 30,20 are joined or locked together, forming a single unit. Under normal operation, once locked, while fastener 10 may be adjusted in length via the threaded connection between first and second sections 30,20, due to the opposing non-tapered face of locking element 38, first and second sections 30,20 will not be separable via unthreading.

Still referring to FIGS. 2A and 2B, first and second sections 30,20 may further comprise annular grooves 56 (see FIG. 2A) formed therein for accepting and securing sealing/anti-vibration elements 55, such as rubber o-rings (see FIG. 2B). Elements 55 may be configured to provide a measure of sealing and dampening between the objects secured via the fasteners described herein.

An actuator assembly 50 may be provided for selectively releasing the fastener once installed. Actuator assembly 50 may include, for example, a rod 51 having first and second end sections 52,53 arranged thereon. In one embodiment, actuator assembly 50 may be assembled concurrently with fastener 10. More specifically, with fastener 10 in an unassembled state, end section 52 may be arranged within an opening 39 of first section 30, and end section 53 may be arranged within an opening 25 in second section 20. Rod 51 may be inserted into either of these openings and mated with one of end sections 52,53. Rod 51 will be mated with the remaining one of end sections 52,53 when sections 30,20 are joined together in the assembly process. In this way, actuator assembly 50 may form an integral part of the assembly (i.e. assembly 50 is retained within coaxial openings 31,39 throughout the use of the fastener). In another embodiment of the present disclosure, actuator assembly 50 may comprise a separate, removable portion of fastener 10. More specifically, actuator assembly 50 may be configured to be inserted into aperture 24 of second section 20, and through openings 25, 31 and 39 of fastener 10 in an assembled state. In either embodiment, opening 39 is in communication with a portion of flange(s) 40 such that the displacement of actuator assembly 50 through these coaxial openings, against flange(s) 40, is operative to pivot flange(s) 40 into a retracted or unlocked position (see FIG. 4A). As described further herein, this arrangement will provide a mechanism by which fastener 10 may be released once installed.

Figure 3:
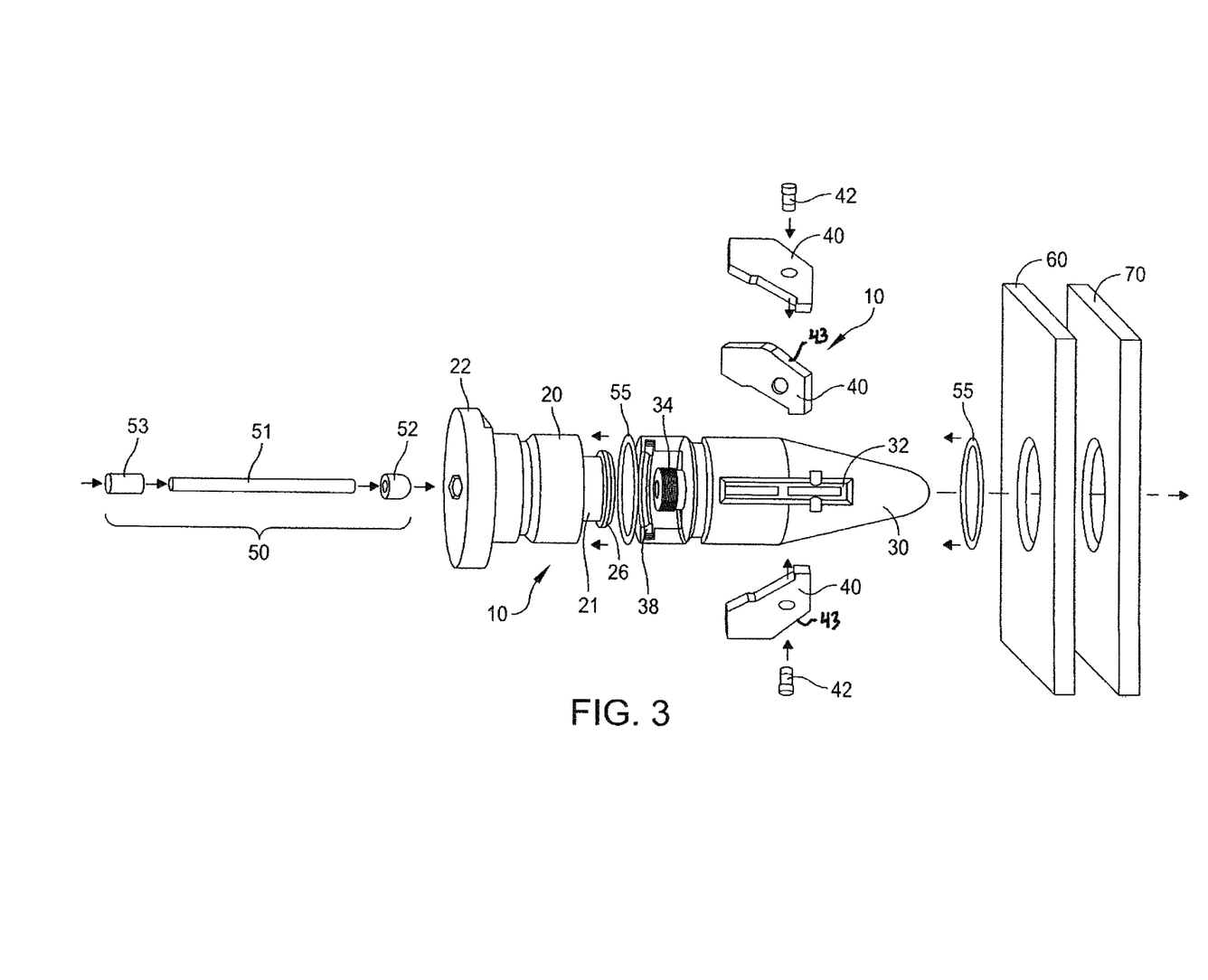
FIG. 3 is a partial exploded view of a fastener according to embodiments of the present disclosure.
Figure 4A:
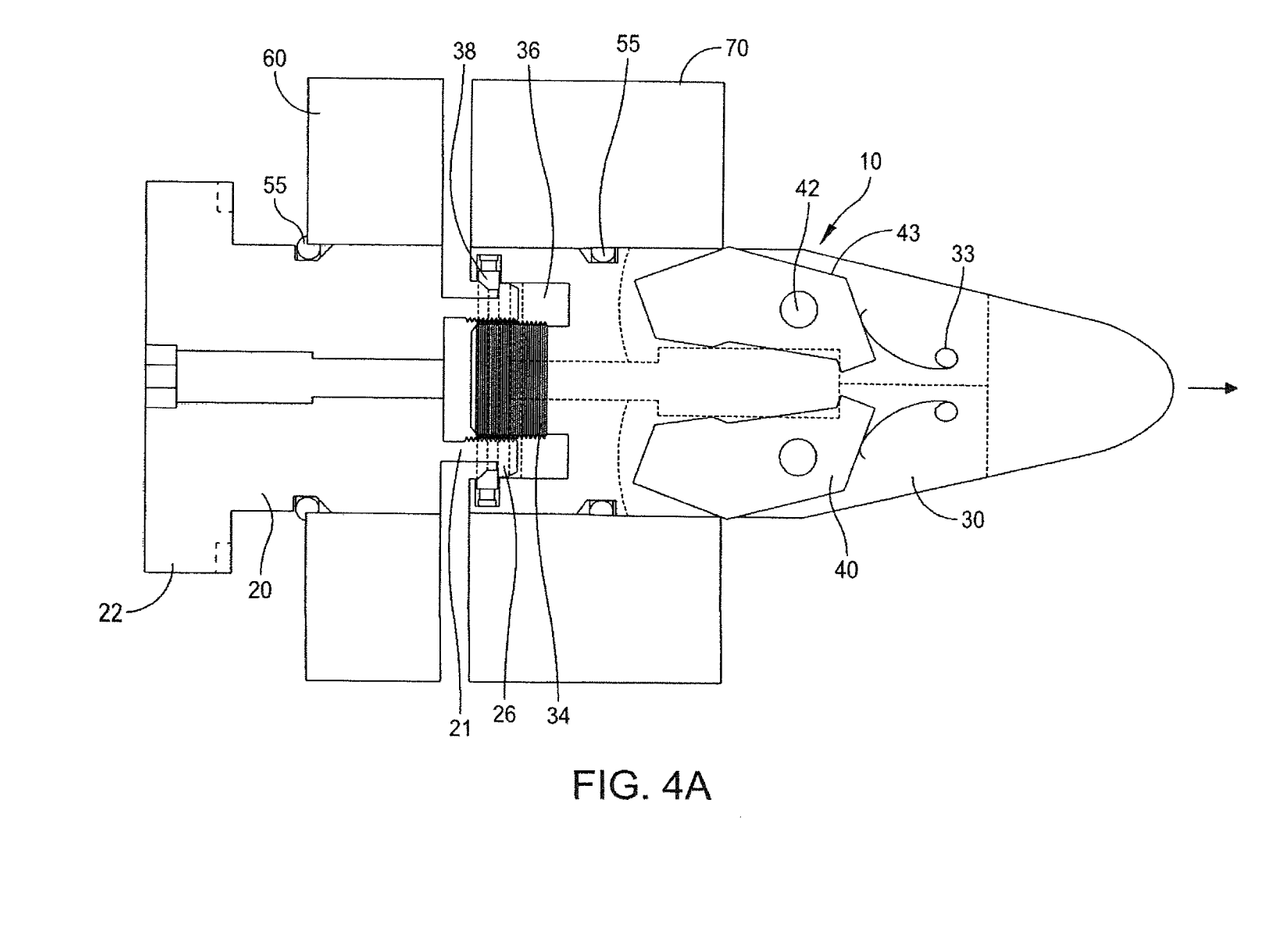
FIGS. 4A-4D are cross-sectional views illustrating the operation of a fastener according to embodiments of the present disclosure.

FIG. 3 includes an unassembled view of fastener 10. Fastener 10 may be used to, for example, secure a cover or panel to a cabinet or equipment rack, portions 60 and 70 of which are shown, respectively. Fastener 10 may be inserted into coaxial holes or openings of cover 60 and cabinet 70 in the illustrated manner. Upon insertion into the opening of cover 60, flange 40 may be biased into the first or collapsed position by a force exerted on a tapered surface 43 of flange 40 (i.e. biased from the position shown in FIG. 1, to that shown in FIG. 4A). Once collapsed, fastener 10 may be continually displaced through the openings of both cover 60 and cabinet 70 as shown in FIG. 4A. Note, in the assembled state, fastener 10 comprises first and second sections 30,20 which are attached via the above-described threaded connection, however, these sections are not fully threaded together, but rather, are only partially threaded such that annular protrusion 21 extends only partially into annular channel 36. It should be noted that vibration and/or sealing elements 55 are arranged such that contact is made circumferentially around the body of the fastener with both cover 60 and cabinet 70.

Figure 4B:
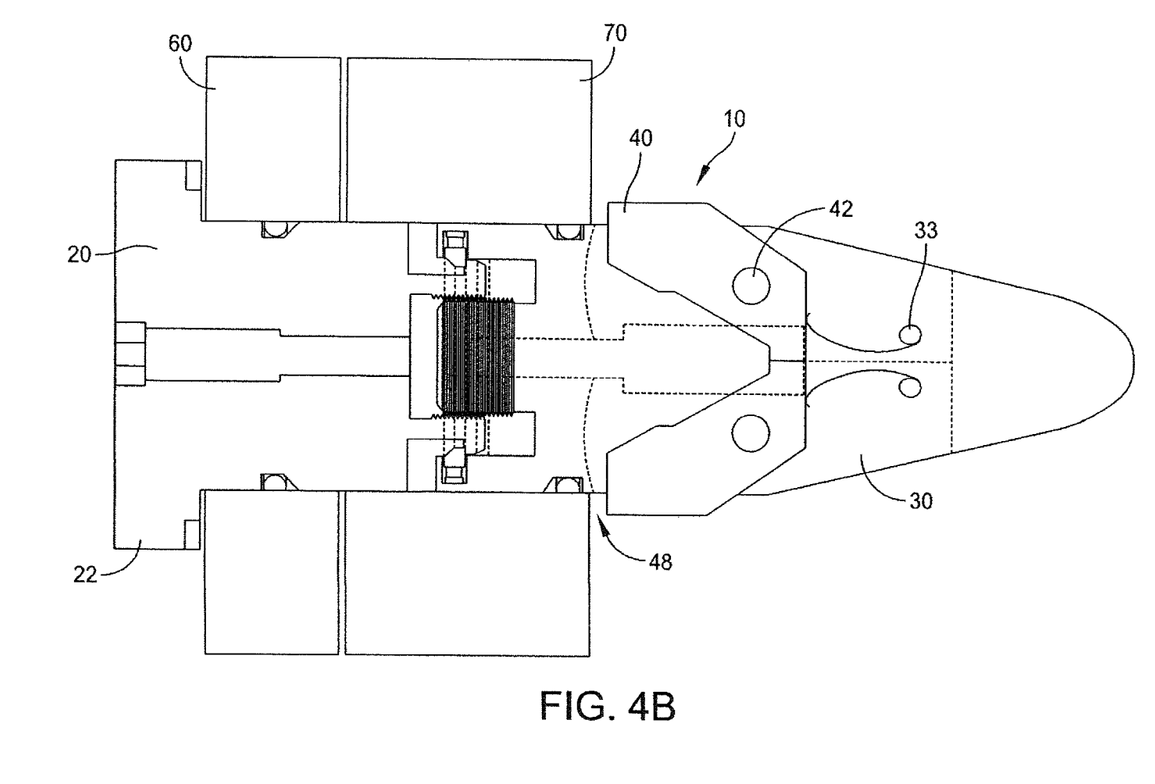

Referring generally to FIG. 4B, once fastener 10 is sufficiently inserted into the openings of cover 60 and cabinet 70 such that flanges 40 have passed through the opening in cabinet 70, the force placed on flanges 40 by spring element 33 will automatically bias flanges 40 to the second, or extended position shown in the figure. Note flange 22 of second body section 20 has abutted, or is nearly abutting the outward-facing surface of cover 60, while a gap or space 48 exists between flanges 40 and the outward-facing surface of cabinet 70. The locking arrangement comprising locking elements 38 and locking feature 26 may or may not be engaged at this point.

Figure 4C:
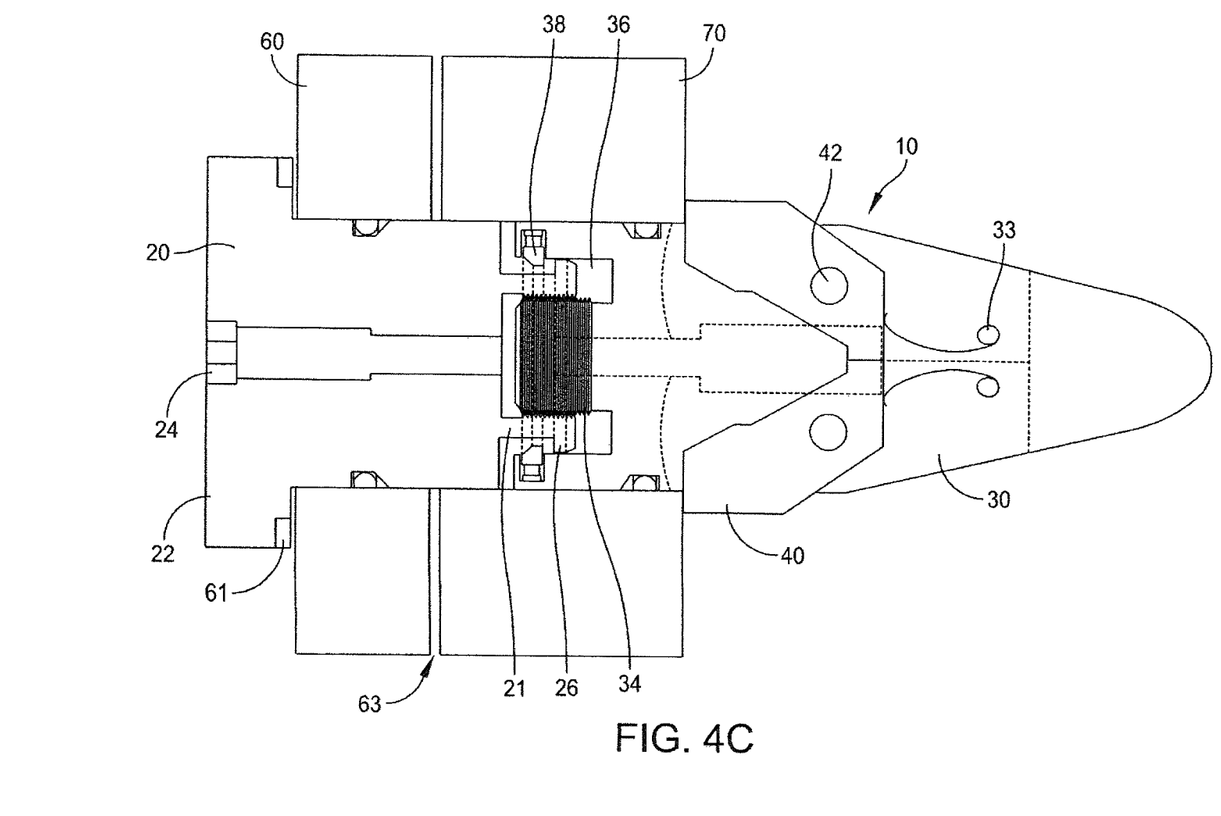
Figure 4D:
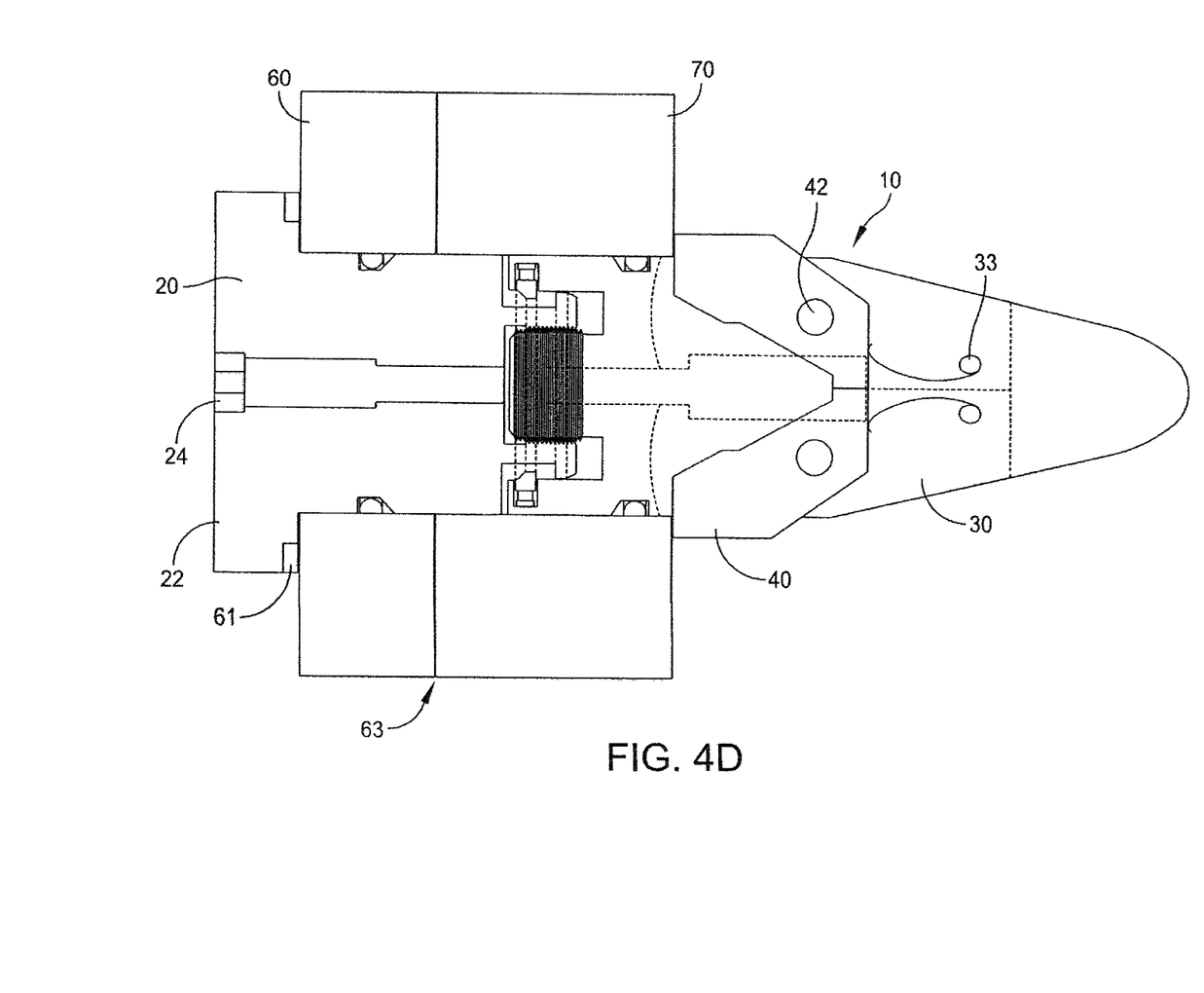

Referring generally to FIGS. 4C and 4D, once in this semi-installed state, fastener 10 may be tightened to secure cover 60 to cabinet 70. More specifically, rotation of second end 20 of fastener 10 (e.g. using hexagonal aperture 24) draws first body section 30 toward the second body section 20 via corresponding threaded protrusions 21,34. As illustrated, locking feature 26 has cleared locking member 38 such that first and second sections 30,20 are secured together. Flange 40 has abutted the outward-facing side of cabinet 70. However, a gap 63 between cover 60 and cabinet 70 still exists. With reference to FIG. 4D, further rotation of second section 20 with respect to first section 30 draws cover 60 and cabinet 70 flush with one another, eliminating gap 63 and securing cover 60 to cabinet 70. As will be understood by one of ordinary skill in the art, by applying an appropriate magnitude of torque on second section 20 of fastener 10, any desired amount of compression between cover 60 and cabinet 70 may be achieved.

Once installed, fastener 10 may be removed entirely from cabinet 70 as set forth above. More specifically, second section 20 of fastener 10 may be rotated so as to loosen fastener 10 with respect to cover 60 and cabinet 70 (i.e. unthreaded) as shown in FIG. 4B. Once loosened, an actuator assembly, such as assembly 50 of FIGS. 2B and 3, may be biased within housing sections 30,20 (e.g. by axial forced placed on an Allen key), and placed in contact with at least a portion of flanges 40. By further displacing assembly 50 axially against flanges 40, flanges 40 will rotate around their pivoting pins 42, against the bias provided by spring 33, into the retracted position. Once retracted, the fastener may be removed from cabinet 70 (and cover 60). In order to aid removal of fastener 10, surfaces 61, or flats may be machined into flange 22, allowing for the introduction of, for example, a prying element (e.g. an extraction tool, a pry bar or hammer claw).

It should be noted that embodiments of the fastener according to the present disclosure provide several advantages over those of the prior art. For example, fasteners described herein can be used blindly, without requiring access to the outward facing side of a cabinet or object. Moreover, they are adjustable and scalable for various applications (e.g. thicknesses of objects to be secured). However, by accurately selecting a fastener sized for known object thicknesses, fastener installation can be expedited. More specifically, by precisely sizing the length of the fastener with respect to the objects to be secured, the number of rotations of the fastener may be minimized to bring the fastener from a partially-installed state (FIG. 4B) to a fully installed state (FIG. 4D).

Figure 5A:
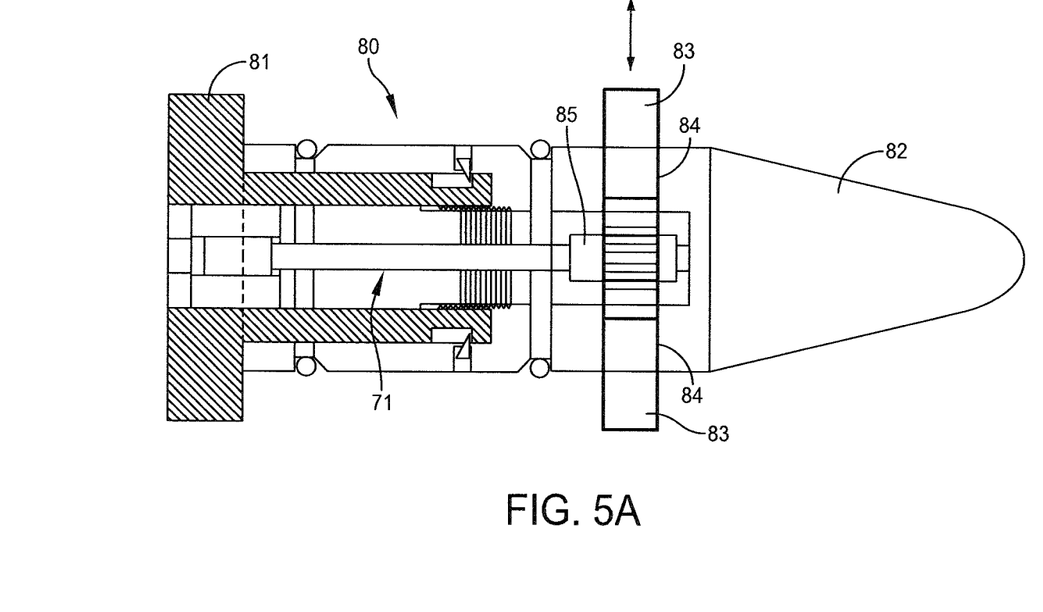
FIGS. 5A and 5B are assembled cross-sectional and top cross-sectional views, respectively, of a fastener utilizing a rack and pinion arrangement according to an embodiment of the present disclosure.
Figure 5B:
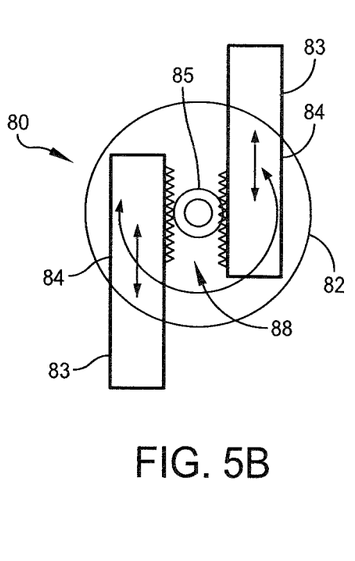

Embodiments of the present disclosure have generally been shown and described as including flanges which are pivotally mounted to a portion of the fastener, and biased between an expanded and a collapsed position via an axial force placed on the flanges by, for example, a rod-like actuator assembly. However, it is envisioned that any number of arrangements may be used to achieve a moveable flange arrangement without departing from the scope of the present disclosure. By way of non-limiting example only, and referring generally to FIGS. 5A and 5B, in another embodiment of the present disclosure, a fastener 80 is provided having a construction similar to those described above with respect to FIGS. 1-4D, including first and second body sections 82,81, and an actuator assembly 71. However, fastener 80 utilizes a rack and pinion arrangement to selectively alter the position of flanges 83 with respect to first section 82. More specifically, flanges 83 may be slidably arranged within corresponding slots or openings 84 in first section 82. At least one of an end 85 of actuator assembly 71 and a portion of each of flanges 83 comprise a toothed surface 88, such that rotational motion of actuator assembly 71 results in the expansion and contraction of flanges 83 in the direction indicated in FIG. 5B (i.e. clockwise motion of assembly 71 contracting flanges 83, and counter-clockwise motion expanding flanges 83). It should be understood that this rotational motion of assembly 71 may be achieved by, for example, an Allen key inserted into the fastener as described above, or by extending the length of assembly 71, such that an operator may rotate the assembly itself, without the need for an additional tool. As set forth above, while not required, flanges 83 may be biased into the expanded position via, for example, one or more spring elements (e.g. a spring element arranged within slots 84, not shown). It should also be noted that while the illustrated embodiment includes flanges being actuated by rotational motion of an actuator assembly, rack and pinion (i.e. geared) arrangements according to embodiments of the present invention may include corresponding toothed surfaces formed on an actuator and the moveable (e.g. pivoting) flanges such that linear motion of an actuator may be operative to bias the flanges between expanded and collapsed positions.

Figure 6A:
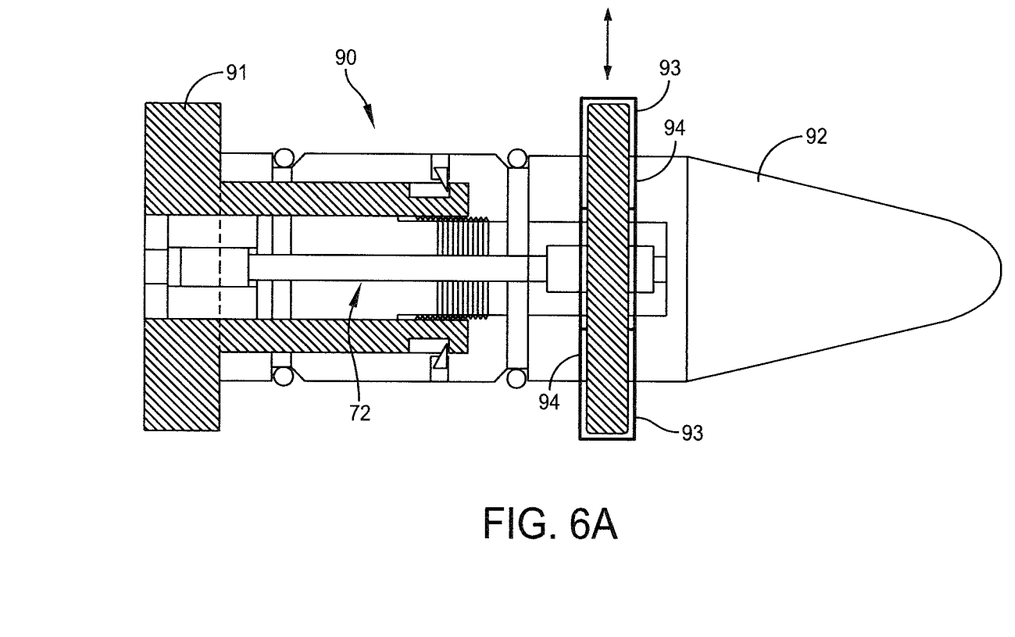
FIGS. 6A and 6B are assembled cross-sectional and top cross-sectional views, respectively, of a fastener utilizing a pulley and tether arrangement according to an embodiment of the present disclosure.
Figure 6B:
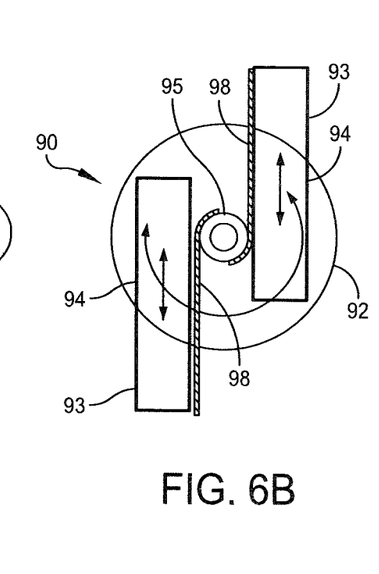

A similar alternative arrangement is provided in FIGS. 6A and 6B, wherein a fastener 90 includes first and second body sections 92,91, and flanges 93 slidably arranged within, for example, slots 94 formed in first body section 92. One or more tethers 98 (e.g. wires) may be connected on a first end thereof to an end 95 of an actuator assembly 72, and on a second end thereof to one or more flanges 93. In this way, flanges 93 are moveably from an expanded to a contracted position via rotation of actuator assembly 72. More specifically, rotating actuator assembly 72 is operative to wind tethers 98 around the end of assembly 72, which in turn places tension on the tethers, drawings flanges 93 radially inward with respect to first body section 92. As set forth above, it should be understood that flanges 93 may be biased into an expanded position by one or more spring elements, and moreover, that embodiments using a tether arrangement may be provide which rely only on linear motion of the actuator to tension the tethers, biasing the flanges radially inward.

Figure 7:
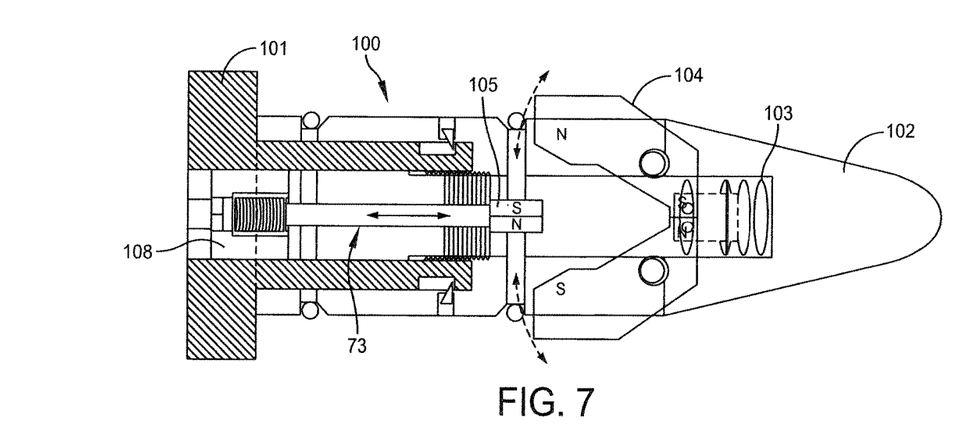
FIG. 7 is an assembled cross-sectional view of a fastener utilizing a magnetic arrangement according to an embodiment of the present invention.
Figure 8A:
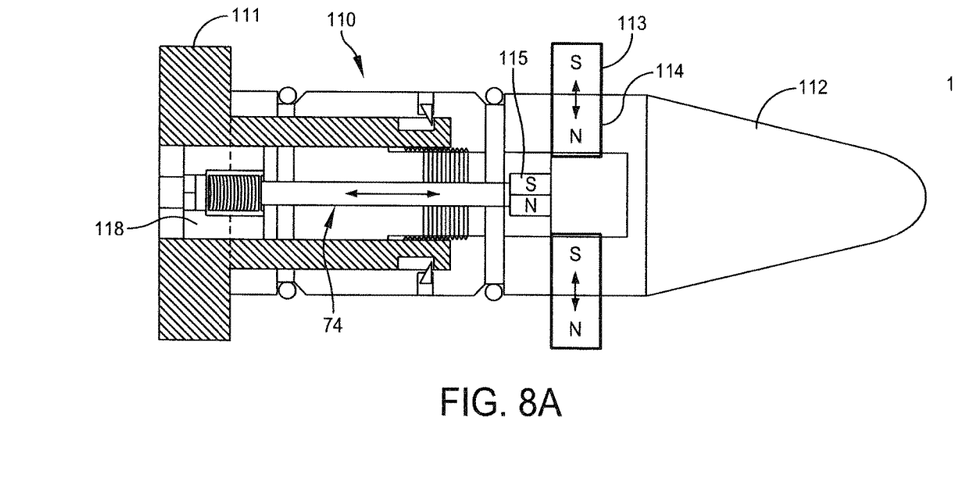
FIGS. 8A and 8B are assembled cross-sectional and top cross-sectional views, respectively, of a fastener utilizing a magnetic arrangement according to an embodiment of the present disclosure.
Figure 8B:
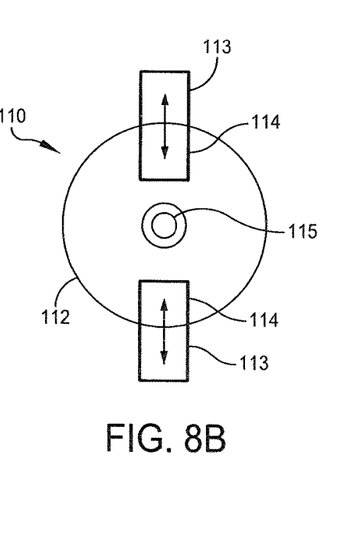

FIGS. 7-9B illustrate embodiments of the present invention which utilize various forms of magnetic activation to bias the flanges between expanded and collapsed positions. For example, FIG. 7 illustrates an embodiment of a fastener 100, including first and second body sections 102,101 and pivotally mounted flanges 104 biased into an expanded position via a spring element 103, similar to that described above with respect FIGS. 1-4D. In the exemplary embodiment, flanges 104 may be magnetized such that an actuator assembly 73, including a magnetized end 105 having north and south poles, may be used to bias flanges 104 between expanded and collapsed positions via forces generated by respective magnetic fields. Similarly, FIGS. 8A and 8B illustrate an embodiment of fastener 110, having body sections 112,111, and flanges 113 arranged within slots 114, similar to that of FIGS. 5A-6B. Actuator assembly 74 includes a magnetized end 115, which is used to bias flanges 113 in the manner described above with respect to FIG. 7. Still referring to FIGS. 7-8B, axial displacement of actuator assemblies 73,74 may be achieved manually, or by solenoids 108,118. Moreover, it should be understood that solenoid-powered arrangements may be implemented into any of the above-described embodiments to achieve either axial or rotational motion of an actuator without departing from the scope of the present invention.

Figure 9A:
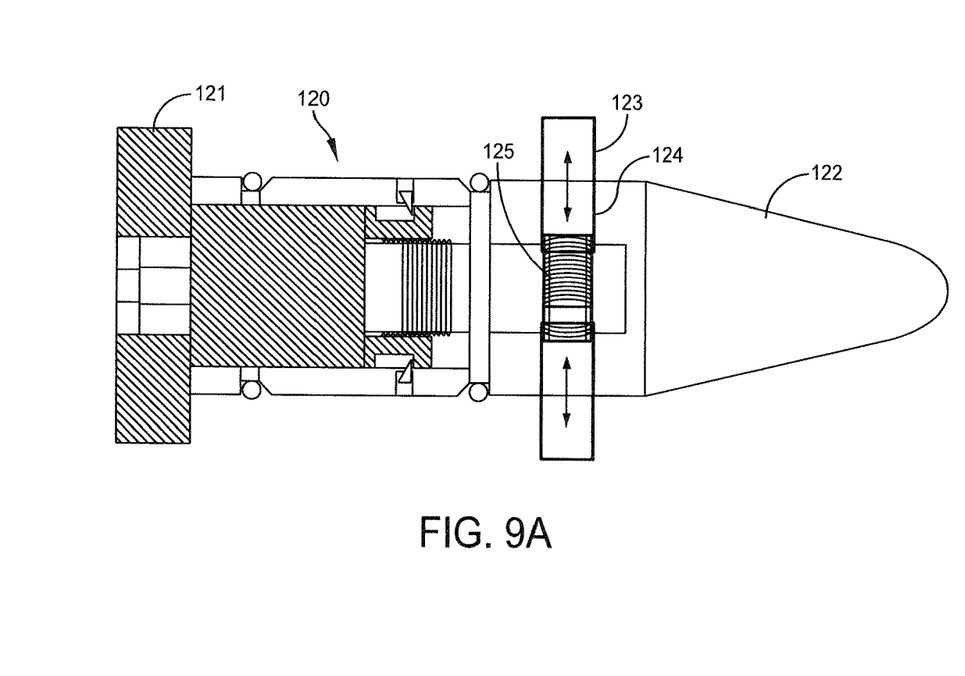
FIGS. 9A and 9B are assembled cross-sectional and top cross-sectional views, respectively, of a fastener utilizing a solenoid arrangement according to an embodiment of the present disclosure.
Figure 9B:
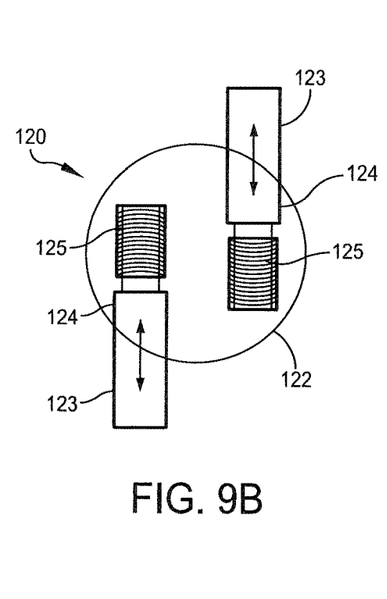

Finally, FIGS. 9A-9B illustrate an embodiment of a fastener 120, including body sections 122,121 and flanges 123 moveably (e.g. slidably) arranged in slots 124. Flanges 123 may be biased between expanded and collapsed positions via electromagnets, or solenoids 125 operatively connected to an end of each flange. It should be noted that because the through holes for an actuator assembly are no longer necessary with solenoid driven flanges, body section 121 may comprise a generally solid construction, improving fastener strength.

Power may be provided to solenoids 125 by any suitable means, including, but not limited to wireless power transmission (e.g. RF power transmission) or other portable power sources which may be operatively connected to fastener 120 when removal thereof is desired. Thus, it is envisioned that once installed, a fastener (or cover) may be removed by a technician utilizing a corresponding power source to activate solenoids 125, collapsing flanges 123. In the case of either a wired or wireless connection to a power supply, it is envisioned that these power sources may be coded, or otherwise protected against tampering, such that power supplied from an unauthorized source will not be operative to activate solenoids 125.

Systems according to the above-described embodiments provide improved captive fasteners compared to conventional fasteners, by providing a fastener that is reusable and not integral to the panel that is used with, in addition to the above-described drawbacks associated therewith. Moreover, while fasteners according to embodiments described herein are not integral to the panels, or covers, embodiments of the present invention may be fitted with retaining features used to selectively secure the fastener to the cover for aiding in re-installation procedures. For example, this retaining function may be provided by o-rings 55 described earlier herein. More specifically, friction generated between one or more o-rings and a cover provide for the fastener to remain secured to the cover for re-installation thereof when advantageous for the user, or the assembled fastener may be removed entirely as described earlier herein. This is unlike traditional captive fasteners which are affixed to a panel such that the panel must be removed to remove the fastener. In accordance with embodiments of the present invention, complexity, cost, and installation time reductions may be realized over the prior art arrangements.

While embodiments of the present disclosure have generally been described in the context of captive fasteners with two panel systems, it should be understood that embodiments of the present disclosure may be applied more generally to various multi-panel systems without departing from the scope of the present invention.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A fastener comprising:
   a body having a first portion and a second portion, the first and second body portions adjustably connected such that the distance between the first body portion and the second body portion is adjustable along a longitudinal axis of the body;
   a first magnetized flange moveably mounted to the first body portion and configured such that the first magnetized flange is moveable in a radial direction relative to the longitudinal axis of the body in response to a magnetic force; and
   a second flange arranged on the second body portion;
   wherein the first magnetized flange is moveable between a first collapsed, unlocking position, and a second expanded, locking position;
   wherein the second position is generally radially outward with respect to the longitudinal axis of the body.

2. The fastener of claim 1, wherein the first and second body portions are adjustably connected via complementary threaded surfaces formed thereon.

3. The fastener of claim 1, wherein the second flange comprises an annular protrusion formed on the second body portion.

4. The fastener of claim 1, wherein the first magnetized flange is rotatably mounted to the first body portion.

5. The fastener of claim 1, further comprising an actuator moveably mounted within the body, wherein the radial position of the first magnetized flange is configured to be effected by the position of the actuator within the body.

6. The fastener of claim 5, wherein the actuator includes a magnet, and wherein the radial position of the first magnetized flange is effected by magnetic attraction between the first magnetized flange and the actuator.

7. The fastener of claim 6, further comprising a third magnetized flange moveably mounted to the first body portion, wherein the first magnetized flange and the third magnetized flange have opposite polarities, and wherein the position of the third magnetized flange is effected by magnetic attraction between the third magnetized flange and the magnet of the actuator.

8. A fastener comprising:
   a body having a first portion and a second portion, the first and second body portions adjustably connected such that the distance between the first body portion and the second body portion is adjustable along a longitudinal axis of the body;
   a first magnetized flange moveably mounted to the first body portion and configured such that the first magnetized flange is moveable in a radial direction relative to the longitudinal axis of the body in response to a magnetic force; and
   a second flange arranged on the second body portion; and
   a locking mechanism for securing the first and second body portions together while permitting adjustment of the distance between the first and second body portions in the direction of the longitudinal axis,
   wherein the locking mechanism comprises a moveable locking element arranged on one of the first or second body portions.

9. The fastener of claim 8, wherein the moveable locking element is configured to engage with a recess formed in the other one of the first or second body portions when the first and second body portions are connected.

10. The fastener of claim 9, wherein the moveable locking element and recess are sized such that the distance between the first and second body portions may be adjusted along the longitudinal axis while the moveable locking element remains engaged within the recess.

11. The fastener of claim 9, wherein the recess comprises an annular channel.

12. The fastener of claim 8, wherein the moveable locking element is spring biased into a locked position.

13. A fastener comprising:
   a body having a first portion and a second portion, the first and second body portions adjustably connected such that the distance between the first body portion and the second body portion is adjustable along a longitudinal axis of the body;
   a first magnetized flange moveably mounted to the first body portion; and
   a second flange arranged on the second body portion,
   wherein the second body portion comprises an internal cavity extending therethrough;
   wherein the first body portion comprises an internal cavity extending at least partially therethrough and in communication with at least a portion of the first magnetized flange; and
   wherein the internal cavity of the second body portion is in communication with the internal cavity of the first body portion.

14. A fastener comprising:
   a body having a first portion and a second portion, the first and second body portions adjustably connected such that the distance between the first body portion and the second body portion is adjustable along a longitudinal axis of the body;
   a first flange moveably mounted to the first body portion such that the first flange is moveable in a radial direction relative to the longitudinal axis of the body; and
   an actuator arranged within the body and including a magnet, wherein the radial position of the first flange is configured to be effected by a magnetic force generated by the magnet of the actuator.

15. The fastener of claim 14, further comprising a second flange moveably mounted to the first body portion, wherein the first and second flanges comprise magnetized flanges of opposite polarities, and wherein the positions of the first and second magnetized flanges are effected by magnetic attraction between the first and second magnetized flanges and the magnet of the actuator.

16. The fastener of claim 14, wherein the first body portion comprises a first internal cavity extending at least partially therethrough and in communication with at least a portion of the first flange, wherein the second body portion comprises a second internal cavity extending therethrough and in communication with the first internal cavity of the first body portion, and wherein the actuator is configured to be moveably arranged within the first and second internal cavities.

* * * * *